US010939692B2

(12) United States Patent
Sallam et al.

(10) Patent No.: US 10,939,692 B2
(45) Date of Patent: Mar. 9, 2021

(54) METHOD FOR CULTURING AQUATIC ANIMALS WITH ASPARTYL-DIPEPTIDES

(71) Applicant: Cysal GmbH, Muenster (DE)

(72) Inventors: Ahmed Sallam, Muenster (DE); Martin Krehenbrink, Muenster (DE); Dimitar Kalkandzhiev, Muenster (DE)

(73) Assignee: Cysal GmbH, Muenster (DE)

( * ) Notice: Subject to any disclaimer, the term of this patent is extended or adjusted under 35 U.S.C. 154(b) by 258 days.

(21) Appl. No.: 15/769,309

(22) PCT Filed: Oct. 21, 2016

(86) PCT No.: PCT/EP2016/075432
§ 371 (c)(1),
(2) Date: Apr. 18, 2018

(87) PCT Pub. No.: WO2017/068149
PCT Pub. Date: Apr. 27, 2017

(65) Prior Publication Data
US 2018/0303128 A1  Oct. 25, 2018

(30) Foreign Application Priority Data

Oct. 21, 2015 (EP) .................................... 15190872

(51) Int. Cl.
*A23K 20/147* (2016.01)
*A23K 50/80* (2016.01)
*A23K 20/142* (2016.01)

(52) U.S. Cl.
CPC .......... *A23K 20/147* (2016.05); *A23K 20/142* (2016.05); *A23K 50/80* (2016.05)

(58) Field of Classification Search
CPC ..... A23K 20/147; A23K 20/142; A23K 50/80
See application file for complete search history.

(56) References Cited

U.S. PATENT DOCUMENTS

2003/0099689 A1  5/2003  Dabrowski et al.
2019/0117548 A1*  4/2019  Sallam ................... A61Q 19/08

FOREIGN PATENT DOCUMENTS

WO          89/06497 A1    7/1989

OTHER PUBLICATIONS

Hurrell et al. Mechanism of Heat Damage in Proteins. British Journal of Nutrition. Nov. 1975. vol. 35, pp. 383-395.*
European Search Report in corresponding European Patent Application No. 15190872.0 dated May 13, 2016 (eight pages).
Ahmed Sallam, et al., "Dipeptides in nutrition and therapy: cyanophycin-derived dipeptides as natural alternatives and their biotechnological production," Applied Microbiology and Biotechnology, Springer, Berlin, Germany, vol. 87, No. 3, pp. 815-828, (May 13, 2010).
Bendik F. Terjesen, et al., "Optimization of dipeptide-protein mixtures in experimental diet formulations for rainbow trout (*Oncorhynchus mykiss*) alevins," Elsevier, Aquaculture, Amsterdam, Netherlands, vol. 254, No. 1-4, pp. 517-525 (Apr. 28, 2006).
Peter B. Johnsen, et al., "Chemical Feeding Stimulants for the Herbivorous Fish, *Tilapia zillii*," Comparative Biochemistry and Physiology, Part A, Comparative Physiology, Elsevier Science, Ltd., vol. 83, No. 1, pp. 109-112, (Jan. 1, 1986).
G.E. Berge, et al., "Effects of feeding Atlantic salmon (*Salmo salar* L.) imbalanced levels of lysine and arginine," Aquaculture Nutrition, vol. 8, No. 4, pp. 239-248, (Dec. 1, 2002).
International Search Report and Written Opinion of the International Searching Authority in related International Application PCT/EP2016/075432 dated Jan. 9, 2017 (13 pages).
Md. Shah Alam, et al., "Supplemental effects of coated methionine and/or lysine to soy protein isolate diet for juvenile kuruma shrimp, *Marsupenaeus japonicus*," Elsevier Science, Aquaculture, vol. 248, pp. 13-19 (2005).
A.M. Bakke-McKellep, et al., "Absorption of glucose, amino acids, and dipeptides by the intestines of Atlantic salmon," Fish Physiology and Biochemistry, Kluwer Academic Publishers, Netherlands, vol. 22, pp. 33-44 (2000).
Gerd Eikeland Berge, et al, "Nutrition of Atlantic Salmon (*Salmo salar*): The Requirement and Metabolism of Arginine," Elsevier Science Inc., Comp. Biochem. Physiol., vol. 117A, No. 4, pp. 501-509 (1997).
Katherine P. Boebel, et al., "Efficacy of Methionine Peptides as Determined by Chick Bioassay," University of Illinois, Department of Animal Science, pp. 1130-1132, American Institute of Nutrition (1982).
Vincenzo Bronte, et al., "Regulation of Immune Responses by L-Arginine Metabolism," Nature Reviews, Nature Publishing Group, vol. 5, pp. 641-654 (Aug. 2005).
Hannelore Daniel, et al., "From Bacteria to Man: Archaic Proton-Dependent Peptide Transporters at Work," Int. Union Physiol Sci./Am. Physiol Soc., vol. 21, pp. 93-102 (2006).
Regulations; Commission Regulation (EC) No. 152/2009, Official Journal of European Union, vol. 54, pp. 1-130 (Jan. 27, 2009).
FAQ Global Aquaculture Production Volume and Value Statistics Database Updated to 2012, FAO Fisheries and Aquaculture Department, pp. 1-4, (Mar. 2014).
Christopher L. Delgado, et al., "Fish to 2020—Supply and Demand in Changing Global Markets," International Food Policy Research Institute and WorldFish Center, pp. 1-226 (2003).
State of world aquaculture 2006, Inland Water Resources and Aquaculture Service, Fishery Resources Division, FAO Fisheries Technical Paper, No. 500, pp. 1-134, Food and Agriculture Organization of the United Nations, Rome (2006).

(Continued)

*Primary Examiner* — Anthony J Weier

(74) *Attorney, Agent, or Firm* — Kilpatrick Townsend & Stockton LLP

(57) ABSTRACT

The invention provides a composition for use in culturing aquatic animals that includes one or more β-aspartyl dipeptides, or oligomers thereof, or salts thereof, wherein each of said β-aspartyl dipeptides comprises a β-L-aspartyl moiety as the first amino acid residue. The invention further relates to use of this composition as feed or feed additive for aquatic animals and as a method for culturing aquatic animals.

19 Claims, 1 Drawing Sheet

(56) References Cited

OTHER PUBLICATIONS

Figure 1:
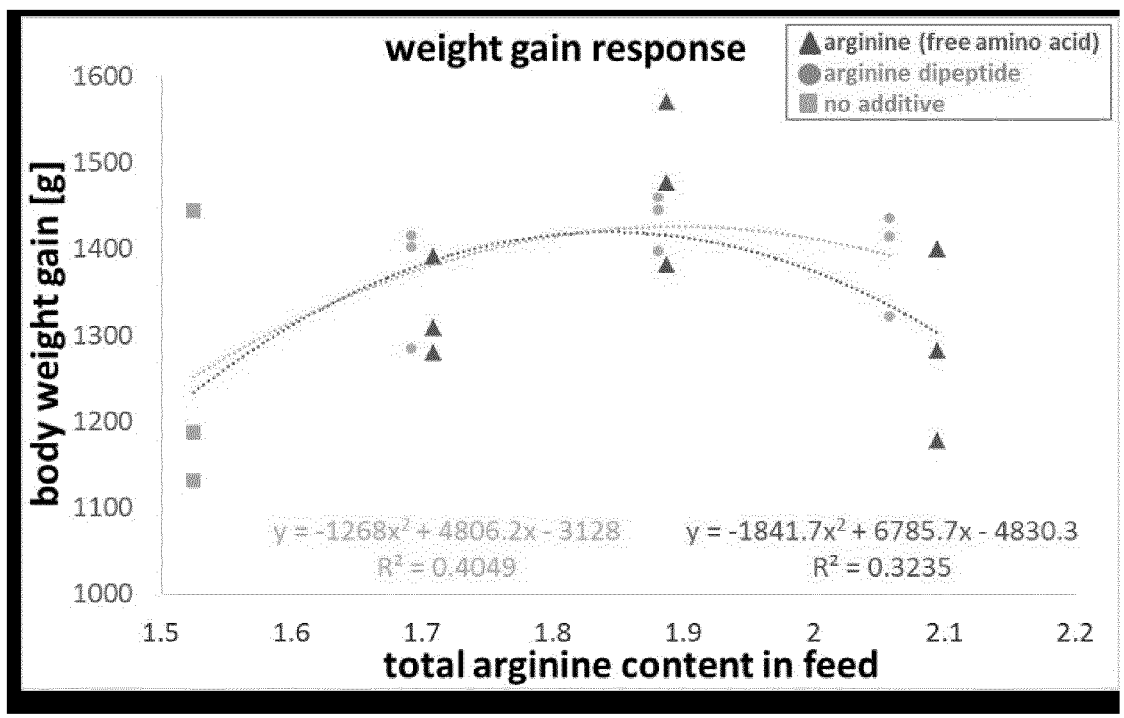

S.P. Lall, et al., "Quantitative arginine requirement of Atlantic salmon (*Salmo salar*) reared in sea water," Elsevier, Aquaculture, vol. 124, pp. 13-25 (1994).
Vijaya R. Pattabiraman, et al., "Rethinking amide bond synthesis," Nature, vol. 480, pp. 471-479 (Dec. 2011).
Samad Rahimnejad, et al., "Comparison of Free and Dipeptide Lysine Utilization in Diets for Juvenile Olive Flounder *Paralichthys olivaceus*," The Korean Society of Fisheries and Aquatic Science, vol. 17, No. 4, pp. 1-7 (2014).
Ahmed Sallam, et al., "Biotechnological Process for Production of β-Dipeptides from Cyanophycin on a Technical Scale and Its Optimization," Applied and Environmental Microbiology, vol. 75, No. 1, pp. 29-38 (Jan. 2009).
A. Sallam et al., "Cyanophycin-degrading bacteria in digestive tracts of mammals, birds and fish and consequences for possible applications of cyanophycin and its dipeptides in nutrition and therapy," The Society of Applied Microbiology, Journal of Applied Microbiology, vol. 107, pp. 474-484 (2009).

\* cited by examiner

METHOD FOR CULTURING AQUATIC ANIMALS WITH ASPARTYL-DIPEPTIDES

This application is a U.S. National Phase Application of PCT/EP2016/075432, filed Oct. 21, 2016, which claims priority to European Patent Application No. 15190872.0, filed Oct. 21, 2015, the entireties of which are incorporated by reference herein.

The invention provides a composition for use in culturing aquatic animals that comprises one or more β-aspartyl dipeptides, or oligomers thereof, or salts thereof, wherein each of said β-aspartyl dipeptides comprises a β-L-aspartyl moiety as the first amino acid residue. The invention further relates to use of this composition as a feed or feed additive for aquatic animals and as a method for culturing aquatic animals.

BACKGROUND OF THE INVENTION

According to the recent FAO (Food and Agriculture Organization of the United Nations) Global Aquaculture Production Volume and Value Statistics Database, the world aquaculture production in 2012 was 90.43 million tons, including 66.63 million tons of food fish supplying a global average of 9.41 kg of food fish consumption per person. The contribution of aquaculture to the world total fish production increased from 25.7% in 2000 to 42.2% in 2012 with finfish aquaculture, especially inland aquaculture of herbivorous and omnivorous finfish species, as most important subsector of aquaculture production in volume terms. This represents a source of affordable quality protein food in many developing countries.

The fast growing importance of aquaculture necessitated the development of innovative solutions for enhancing its effectivity. In this regard, feed is usually considered as the most important cost factor in aquaculture production. Thus, intensive efforts are being invested worldwide to optimize feed formulations and to find innovative but economic feed components and additives.

The amino acids arginine and lysine are important components in the nutrition of aquaculture organisms and play a significant role in their economic husbandry. While the amino acid lysine is essential for both humans and fish, arginine is considered semi-essential in humans but is regarded to be essential for most fish species, and considered to be critical for its early development stages. Since feed from natural sources of protein such as soy, corn, and wheat is usually deficient in certain essential amino acids, targeted supplementation with these amino acids, such as arginine and lysine, contributes to a faster growth and more efficient utilization of the feed.

However, several problems are known in fish and crustaceans when supplementing feed with essential amino acids. Nevertheless, through the rapid economic development of the farming of fish and crustaceans in highly industrialized aquaculture, optimal, economical, and efficient means of supplementing essential and limiting amino acids have become of increasing importance in recent years (FAO, Fisheries Department "State of World Aquaculture 2006", 2006, Rome. International Food Policy Research Institute (IFPRI) "Fish 2020: Supply and Demand in Changing Markets", 2003, Washington, D.C.). The effective feeding of fish and crustaceans in aquaculture therefore requires, for certain species and applications, a special form of amino acids, for example, a suitable chemical or physical protection to render them sufficiently stable during feeding in the aqueous environment and prevent them leaching out of the feed. On the other hand, the formulation must allow the amino acid product to be taken up by the animal. Many attempts have been conducted to develop suitable or optimized feed additives based on amino acids for fish and crustaceans, e.g.:

Johnsen and Adams, Comp. Biochem. Physiol. 83A(1): 109-112 (1986) and Berge et al., Aquaculture Nutrition 8:239-248 (2002) describe the feeding of free amino acids to fish, including aspartic acid, lysine and arginine.

WO89/06497 describes the use of di- and tripeptides as feed additive to promote growth for fish and crustaceans. However, preferably di- and tripeptides from nonessential as well as non-limiting amino acids present in sufficient amounts in many vegetable protein sources, e.g. glycine, alanine and serine, were used. Similarly, Terjesen et al., Aquaculture 254:517-525 (2006) compares the feeding of rainbow trout with free amino acids and that with certain synthetic dipeptides.

WO2002/088667 describes the enantioselective synthesis and use of oligomers from Methionine Hydroxy Analog (MHA) and amino acids, e.g. methionine, as feed additives for fish and crustaceans among others. It is said that faster growth can be achieved as a result. The oligomers described are synthesized by an enzyme-catalyzed reaction and have a very wide distribution of chain lengths of the individual oligomers. As a consequence, the method, and thereby the product, is unselective, expensive, and complicated in execution and purification.

US2003/099689 describes the use of synthetic peptides, including dipeptides such as lys-lys, gly-lys and asp-arg (i.e. the conventional α-asp-arg), as growth-promoting feed additives for aquatic animals with a peptide proportion of 6-50% (wt/wt) of the total feed formulation. The enantioselective synthesis of these synthetic oligo- and polypeptides is, however, very complicated, expensive, and difficult to scale up. Moreover, the efficacy of homopolypeptides consisting of one individual amino acid is disputed due to their very slow or even absent conversion to free amino acids in physiological conditions (Boebel and Baker, J. Nutr. 112: 1130-1132 (1982).

US2011/295006 describes various known problems of the use of crystalline essential amino acids with certain species of fishes and crustaceans. It cites several previously published trials for the synthesis of chemically protected dipeptides in the form of diketopiperazines (cyclo-dipeptides, dehydrodipeptides) as a solution, and also the disadvantages thereof. The invention relates to feed additives containing synthetic chemically-protected diketopiperazines of essential, limiting amino acids. The dipeptide cyclo-DL-Met-DL-Met was preferably used.

A recent study of Rahimnejad and Lee, Fish Aquat. Sci. 17(4):1-7 (2014) compared the utilization efficiency of free lysine and the dipeptide lysine-glycine in terms of growth performance and whole-body amino acid composition in olive flounder. Supplementation with the dipeptide, compared to free lysine, provided significant improvement in protein efficiency ratio (PER), Hepatosomatic index, viscerosomatic index, and overall amino acid retention in the fish body. The authors reviewed previous published findings in the field and concluded that juvenile olive flounder can utilize lysine-glycine more efficiently than free lysine for protein synthesis. This study was conducted with a chemically synthesized dipeptide which is, as in case of most other chemically synthesized dipeptides, far from being economically feasible for a mass-production field like aquaculture.

In addition to trials to develop and/or use chemical derivatives of amino acids for aquaculture, various possibilities for physical protection were also investigated, e.g. coatings. For example, Alam et al., Aquaculture 248:13-19 (2005) showed that coated methionine and lysine, in comparison to their uncoated form, have a very positive influence on the growth of young kuruma shrimps. Although the use of a special coating prevented leaching of methionine and lysine from the feed pellet, there are some serious disadvantages. Coating of amino acids is generally a technically complicated process and is therefore expensive, and the protective layer can easily be damaged by mechanical stresses during feed processing. Furthermore, coating or related techniques reduce the content of amino acid and is therefore often uneconomical.

In general, a realistic practical use of a functional peptidic molecule depends largely on the complexity of its synthesis method and whether it could be successfully scaled up. These main factors determine the economic feasibility of the product itself and thereby the industrial applicability of the functional peptidic molecule. For the chemical synthesis, the overview article of Pattabiraman and Bode, Nature 480:471-479 (2011) describes the development degree in this field which did not change largely till today: "Improved methods for the synthesis of amide functionality, whether catalytic and waste-free or chemoselective and suitable for fragment coupling, are in great demand." The author also refers to the vote of the American Chemical Society Green Chemistry Institute (comprising members from major pharmaceutical industries worldwide) in 2007 on the "amide formation avoiding poor atom economy reagents" as "top challenge for the organic chemistry". Furthermore, the chemical peptide synthesis as well as promising biotechnological approaches such as L-amino acid ligase remains particularly challenging when it comes to basic amino acids like arginine and lysine, due to their properties.

Dipeptides and tripeptides are proven to be absorbed by higher organisms via specialized transporters that do not accept larger molecules or free amino acids. They essentially transport all possible di- and tripeptides (with a few exceptions) composed of L-α-amino acids as well as a large variety of derivatives (Daniel et al. PHYSIOLOGY 21:93-102 (2006)).

On the other hand, WO2009/150252 discloses the preparation of certain unprotected dipeptides, such as dipeptides comprised of the combinations L-arginine/β-L-aspartic acid (β-asp-arg) and L-lysine/β-L-aspartic acid (β-asp-lys) by enzymatic degradation of cyanophycin or cyanophycin-like polymers. Suitable enzymes for such degradation are of bacterial origin (WO2009/150252; Sallam et al., Appl. Environ. Microbiol. 75:29-38 (2009)), which are also found in certain digestive tracts of mammalian, avian and fish gut flora (Sallam and Steinbüchel, J. Appl. Microbiol 107:474-484 (2009); Sallam and Steinbüchel, Appl. Microbiol. Biotechnol. 87:815-828 (2010)). The use of the cyanophycin degradation products for feeding aquatic animals is however not contemplated in WO2009/150252.

On the other hand, it was now found that these β-dipeptides derived from cyanophycin degradation or oligomers thereof are a suitable source for essential amino acids for many omnivorous, herbivorous and carnivorous fish and crustacean species that live in salt water or freshwater, which was highly surprising as only α-di- and tripeptide transport was known so far (Daniel et al. PHYSIOLOGY 21: 93-102 (2006)).

Said β-dipeptides and its oligomers serve as a substitute for the widely applied free amino acids as a feed component/additive with very high biological value, and have good handling, storage and stability properties in the usual conditions of mixed feed processing, in particular pelletization and extrusion without physical protection.

In this way, for fish and crustaceans, additional efficient sources of essential amino acids could be made available. The use of the cyanophycin degradation products in the present invention, which do not have the disadvantages of the conventional forms or protected amino acids, could solve or participate in solving problems known for amino acids in the area of feed formulation or the mutual inhibition of certain amino acids at absorption sites.

SHORT DESCRIPTION OF THE INVENTION

The invention thus provides
(1) a composition for use in culturing aquatic animals comprising one or more β-dipeptides, or oligomers thereof, or salts thereof, wherein each of said β-dipeptides comprises β-L-aspartyl as a first amino acid residue;
(2) the use of the composition as described in (1) above as feed or feed additive for aquatic animals, such as fish and crustaceans (shellfishes), including eggs, fry, juvenile fish and adult fish, as well as shellfish, including eggs, larvae, and juvenile and adult shellfish;
(3) a method for culturing aquatic animals, said method comprising feeding the aquatic animals with the composition as described in (1) above.

SHORT DESCRIPTION OF THE FIGURES

Figure 2:
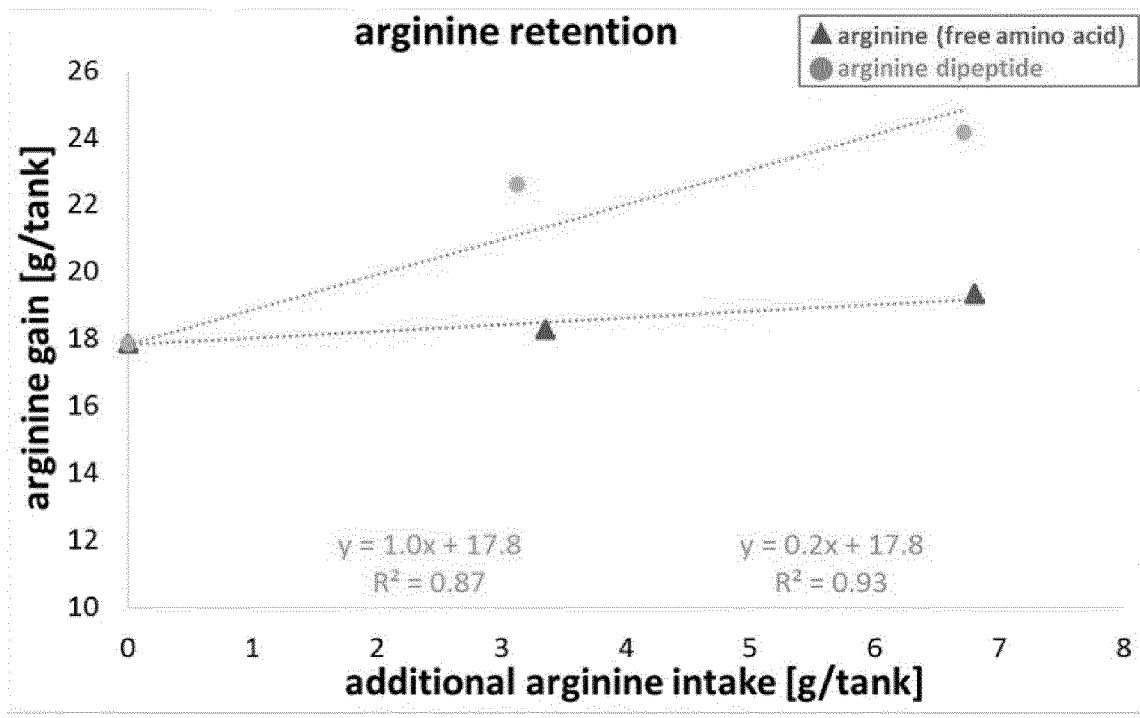

FIG. 1: Weight gain vs. % arginine in diet (DM) in a salmon nutrition experiment.
FIG. 2: Retention efficiency (slope) of the supplemented products in a salmon nutrition experiment.

DETAILED DESCRIPTION OF THE INVENTION

The β-dipeptides or dipeptide oligomers of the compositions of aspect (1) of the present invention are derived from cyanophycin, (also abbreviated CGP, Cyanophycin Granule Peptide) or cyanophycin-like polymer by selective degradation/hydrolysis. In nature, and in addition to several heterotrophic bacteria, most cyanobacterial species (blue-green algae) accumulate the polypeptide CGP as a reserve material for carbon and nitrogen. CGP is accumulated in the early stationary growth phase of bacteria and is mostly composed of two amino acids; aspartic acid and arginine. One or more amino acids, which are structurally similar to arginine such as lysine, ornithine, glutamate, citrulline, and canavanine, may partially replace the arginine content of CGP depending on the environmental/cultivation conditions.

Compared to chemically-synthesized dipeptides, CGP-dipeptides are natural and stereospecific (structurally homogeneous) substances that are produced from biomass in a biotechnological and environmentally-friendly way. The production of CGP dipeptides furthermore requires much less technological expense and effort, very little time, and significantly less financial effort. As the production process employs neither protecting groups nor harmful or environmentally unsafe solvents, the biocompatibility of these dipeptides is always ensured (Sallam et al. AEM 75:29-38 (2009)).

The resulting CGP dipeptide composition obtainable by the degradation/hydrolysis may be composed of a single type of dipeptide, or of a mixture of different dipeptides, or of a single type of dipeptide oligomers, or of a mixture of different dipeptide oligomers, or of mixtures of such dipeptides and dipeptide oligomers. It is however preferred that the dipeptides comprise amino acid residues selected from aspartate, arginine, lysine, and other amino acid residues present in CGP or CGP-like polymers. Particularly preferred is that the dipeptides are selected from β-L-aspartyl-L-arginine and β-L-aspartyl-L-lysine.

A "CGP" and "CGP-like polymer" according to the invention is a peptidic structure essentially comprised of one or more dipeptide units, preferably said dipeptides units are composed of two of the following amino acid residues: aspartic acid, arginine, lysine, glutamic acid, citrulline, ornithine, canavanine, and the like.

A suitable CGPase for the CGP degradation is a CGPase from *P. alcaligenes*, particularly preferred from *P. alcaligenes* strain DIP1. Said CGPase (i) has a molecular weight of 45 kDa, an optimum temperature of 50° C., and an optimum pH range of 7-8.5 and degrades CGP into β-Asp-Arg; and/or (ii) is the *P. alcaligenes* DIP1 CGPase CphE$_{al}$, a strain expressing said CGPase having been deposited with the DSMZ as DSM 21533, or is a mutant, derivative or fragment thereof capable of cleavage of CGP or CGP-like polymers into dipeptides.

The mutants, derivatives or fragments of the aforementioned native CGPase include fragments (having at least 50 consecutive amino acid residues of the native sequence, preferably N- and/or C-terminal truncation products, wherein up to 50 terminal amino acid residues are removed), derivatives (notably fusion products with functional proteins and peptides such as secretion peptides, leader sequences etc., and reaction products with chemical moieties such as PEG, alcohols, amines etc.) and mutants (notably addition, substitution, inversion and deletion mutants, having at least 80%, preferably at least 90%, most preferably at least 95% sequence identity with the native enzyme on the amino acid basis or wherein 1 to 20, preferably 1 to 10, consecutive or separated amino acid residues are added, substituted, inverted and/or deleted; for substitution mutants conservative substitution is particularly preferred), provided, however, that said modified CGPases have the enzymatic activity of the native CGPase.

The degradation process may be preceded by a step that provides the CGP or CGP-like polymer preparation, namely by culturing a prokaryotic or eukaryotic cell line. The producing cell line may be any cell line capable of producing the CGP or CGP-like polymer. It is preferred that the producing cell line is selected from *Escherichia coli, Ralstonia eutropha, Acinetobacter baylyi, Corynebacterium glutamicum, Pseudomonas putida*, yeast strains, and plant biomass. Particularly preferred producing cell lines are *Ralstonia eutropha* H16-PHB⁻4-Δeda (pBBR1MCS-2:: cphA$_{6308}$/edaH16) and *E. coli* DH1 (pMa/c5-914::cphA$_{PCC6803}$).

The above process may further comprise the steps of isolating, purifying and/or chemically modifying the CGP product obtained by cultivating the producing cell line. Such isolation, purification, chemical modification and separation may be effected by methods well established in the art.

It is however preferred that the CGP product obtained by cultivating the producing cell line is directly, i.e. without isolation or purification, subjected to degradation with the CGPase.

Alternatively, the degradation product may be purified and/or chemically modified. Again, such purification, separation, or chemical modification may be effected by methods well established in the art.

In the composition for use in culturing aquatic animals of aspect (1) each of the one or more β-dipeptides comprises β-L-aspartyl as a first amino acid residue, which is covalently bound to a second amino acid residue. The second amino acid residue can be selected from arginine, lysine, ornithine, glutamate, citrulline, and canavanine. Preferably the second amino acid residue is arginine or lysine. Further, the second amino acid residue can be of L- or D-configuration. Thus, the β-dipeptides may have the formula I (β-L-aspartyl-R)

and the dipeptide oligomers may have the formula II (β-L-aspartyl-R)$_n$, wherein R is independently selected from the amino acid residues defined hereinbefore and n is an integer of 2 to 150, preferably 2 to 30, most preferably 2 to 10.

The composition of aspect (1) can further comprise two or more β-dipeptides as described above that are covalently bound together, and wherein the second amino acid residue of each dipeptide is independently selected, preferably selected from arginine, lysine, ornithine, glutamate, citrulline, and canavanine. Most preferably the second amino acid residue is arginine or lysine. Further, the second amino acid residue of each dipeptide can be either of L- or D-configuration. In another embodiment, one or more of the dipeptides are chemically modified. Such chemical modification includes phosphorylation, farnesylation, ubiquitination, glycosylation, acetylation, formylation, amidation, sumoylation, biotinylation, N-acylation, esterification, and cyclization. In a preferred embodiment, the composition of aspect (1) comprises from 0.01 to 50 wt. % of β-dipeptides or oligomers thereof, most preferably from 0.01 to 5 wt. %. The composition of aspect (1) may further comprise one or more free amino acids or salts thereof. These free amino acids are preferably selected form arginine, lysine and methionine. The content of free amino acids in the composition is preferably from 0.01 to 10 wt. %.

Oligomers of the β-dipeptides include homomeric (i.e. composed of one β-dipeptide) and heteromeric (i.e. composed of two or more different β-dipeptides) structures, in which the β-dipeptide units are covalently attached to each other.

The β-dipeptidic products described above are highly stable under several conditions, and are suitable for being admixed with conventional feed components, e.g. cereals, vegetables, legumes, fishmeal, but also in combination with supplemented free amino acids, proteins, peptides, carbohydrates, vitamins, minerals, fats and oils. The composition may also include active ingredients such as plant extracts, prebiotic compounds, probiotics, yeast extracts, short chain fatty acids, medium chain fatty acids, unsaturated long chain fatty acids, fat-soluble vitamins and toxin absorbing compounds.

In particular, the compositions of aspect (1) are basal arginine-limited diets that are supplemented with the said β-dipeptide products to a concentration of 0.01 to 50 wt. % of dipeptides or oligomers thereof, preferably from 0.01 to 5 wt. %. These basal diets were formulated from individual components in common use in the aquaculture feed industry. A basal diet composition for shellfish, such as Tilapia and Kuruma shrimp is composed of the following (in wt. % of the basal diet): corn (e.g. from 1 to 50%, preferably about 40%), soybean meal (e.g. from 1 to 30%, preferably about 21%), rice polishings (e.g. from 1 to 25%, preferably about 14%), gluten (e.g. from 0.1 to 20%, preferably about 11%), wheat bran (e.g. from 0.1 to 15%, preferably about 5%), herring meal (e.g. from 0.1 to 10%, preferably about 5%), monocalcium phosphate (e.g. from 0.01 to 5%, preferably about 0.8%), limestone (e.g. from 0.01 to 5%, preferably about 0.7%), L-lysine HCl (e.g. from 0.01 to 5%, preferably about 0.7%), fish oil (e.g. from 0.01 to 5%, preferably about 0.5%), vitamin mineral premix (e.g. from 0.01 to 5%, preferably about 0.3%), sodium bicarbonate (e.g. from 0.01 to 3%, preferably about 0.15%), salt (e.g. from 0.01 to 3%, preferably about 0.15%), and pellet binder (e.g. from 0.01 to 2.5%, preferably about 0.05%).

A basal diet composition for fish, such as trout and African catfish is composed of the following: casein (e.g. from 1 to 50%, preferably about 35%), wheat flour (e.g. from 1 to 60%, preferably about 55%), fish oil (salmon; e.g. from 0.1 to 10%, preferably about 3%), maize oil (e.g. from 0.1 to 5%, preferably about 2%), trace element mix (e.g. from 0.01 to 3%, preferably about 1%), methionine (e.g. from 0.01 to 5%, preferably about 1.5%), microcrystalline cellulose (e.g. from 0.01 to 10%, preferably about 2.5%), and vitamin mix (e.g. from 1 to 25, preferably about 10 ml/100 g).

Furthermore, the composition of aspect (1) displays good pelletizing and extrusion stability in feed production.

The composition of aspect (1) is preferred for use as feed or feed additive in aquaculture where it may serve as a growth promoter and/or enhancer for vitality, survival rates, and immune response. Aquaculture using said composition comprises various aquatic animals including omnivorous, carnivorous and herbivorous fishes and crustaceans (shellfishes). In a preferred embodiment, the animals raised in aquaculture may be freshwater or salt water fishes or invertebrates, preferably finfishes (e.g. from the family of salmonids) and crustaceans, and most preferably selected from carp, trout, salmon, catfish, perch, flatfish, yellowtail, striped jack, sturgeon, tuna, eels, bream, cod, shrimps, prawns and crab. All developmental stages of fish (egg, fry, juvenile fish, adult fish) or shellfish (eggs, larvae, juvenile shellfish, adult shellfish) may be treated by the use of the composition are the subject matter of the invention.

Aspects (2) and (3) of the invention pertain to the use of the composition (1) for culturing aquatic animals such as fishes and shellfishes and methods for culturing aquatic animals comprising feeding the aquatic animals with the composition of aspect (1). Use according to the present invention may comprise administration of the feed or feed additive by dipping the fishes and/or shellfishes in a solution or suspension comprising the composition of aspect (1), preferably in a concentration from 0.01 to 10% by weight. Such a solution or suspension preferably contains water. Furthermore, use of the composition in aquaculture can include concurrent conventional culture of adult fish or adult shellfish in addition to the above described dipping.

Furthermore, the β-dipeptides and the oligomers thereof improve the meat quality of the target aquatic animal as a result of a higher bioavailability of their constituting amino acids. For example, as arginine is involved in the fat metabolism and several scientific studies in this regard showed that this amino acid influences the Omega-3/Omega-6 ratio to the favor of Omega-3 fatty acids. The shown superior bioavailability of arginine when supplemented in the β-dipeptide form therefore provides further nutritional advantages in terms of fish meat quality.

The DIP1 CGPase CphE$_{al}$ strain was deposited by Westfälische Wilhelms-Universität Münster, Corrensstr. 3, 48149 Münster, Germany with the DSMZ-Deutsche Sammlung von Mikroorganismen und Zellkulturen GmbH, Inhoffenstr. 7b, 38124 Braunschweig, Germany as DSM 21533.

The invention will be further described in the following Examples, which are not to be construed as limiting the invention.

EXAMPLES

Example 1: Production of Dipeptide Composition

CGP and the extracellular CGPase enzyme were produced via separate fermentations before the final CGPase-catalysed breakdown of CGP into dipeptides took place. A recombinant strain of *Ralstonia eutropha* H16-PHB$^-$-4-Δeda (pBBR1MCS-2::cphA$_{6308}$/edaH16) was used for the production of CGP in a 500 L fermentation and using Na-gluconate as a sole carbon source, while the CGPase was produced with *P. alcaligenes* strain DIP1 CphE$_{al}$, said strain having been deposited with the DSMZ as DSM 21533. CGP was then extracted from the produced biomass and purified. CGPase enzyme was purified from the culture supernatant. The produced CGP and the CGPase were then combined under specific conditions, upon which the biopolymer was broken down into its constituent dipeptides. The β-aspartyl-arginine dipeptides were then separated from the remainder of the reaction, analyzed for purity via HPLC, and finally dried to a powder (WO2009150252 and Sallam et al., AEM 75:29-38(2009)). The pure dipeptide powder was added to the feed formulations for the conducted Aquaculture experiments.

Example 2: Aquaculture Screening Experiments

Nearly all of the finfish species relevant to aquaculture belong to three supra-orders: Ostariophysi (e.g. carps, catfish, and allies), Protacanthopterygii (e.g. pike, trouts and salmon), and Acanthopterygii (around 50% of all fish species, including all perches, flatfish, tuna, etc.). In order to cover as much of the phylogenetic range as possible, fish species were chosen from each of these supra-orders (Ostariophysi; *Clarias gariepinus*, Protacanthopterygii; *Oncorhynchus mykiss*, Acanthopterygii; *Oreochromis niloticus*). Additionally, kuruma shrimp (*Marsupenaeus japonicus*) was chosen as a representative species of crustacean due to its significance in the high-end market. At the end of the experiment, the individual weights were recorded and the data analyzed statistically. All experiments started with young fry or postlarvae.

All species except trout were housed during the experiments in parallel recirculation systems of fresh water. *Marsupenaeus japonicus* shrimp were maintained in seawater. *Oreochromis niloticus* and *Clarias gariepinus* were housed in 200-L tanks filtered by a commercial pond filter. Trout were housed in a smaller system composed of 70-l tanks connected in series to account for the species' higher oxygen demand and preference for stronger current. Water quality (oxygen levels, nitrite, and nitrate) was monitored weekly. Partial water replacements were performed if the desired levels were exceeded. (<3 mg O$_2$/l, detectable nitrite, >25 mg/l nitrate). In order to examine the efficiency of dipeptide products after as feed supplements for aquaculture, β-L-aspartyl-arginine as obtained in Example 1 was used in combination with basal arginine-limited diets. The latter diets were supplemented with the said dipeptide products to a concentration of 1.25 or 2.5% (wt/wt), or with corresponding isonitrogenous concentrations of an aspartic acid-arginine mixture (to determine the effect of free amino acids alone). Basal diets were formulated from individual components in common use in the aquaculture feed industry to ensure realistic conditions. For this, the published amino acid requirements of the species were considered to ensure arginine deficiency in the diet.

Basal diet composition for Tilapia and Kuruma shrimp contained a calculated arginine content of about 1.35% (of diet) which is lower than the minimum requirements of both Tilapia and Kuruma shrimp: corn 40%, soybean meal 21%, rice polishings 14%, gluten 11%, wheat bran 5%, herring meal 5%, monocalcium phosphate 0.8%, limestone 0.7%, L-lysine HCl 0.7%, fish oil 0.5%, vitamin mineral premix 0.3%, sodium bicarbonate 0.15%, salt 0.15%, pellet binder 0.05%.

Basal diet composition for trout and African catfish contained a calculated arginine content of about 1.5% (of diet) which is lower than the minimum requirements of both trout and African catfish: casein 35%, wheat flour 55%, fish oil (salmon) 3%, maize oil 2%, NIFI 102 trace element mix 1%, methionine 1.5%, microcrystalline cellulose 2.5%, and vitamin mix 10 ml/100 g.

Results:

1. *Clarias gariepinus* after four months. Started with 50 fish.

|  | control | 1.25% Asp/Arg | 2.5% Asp/arg | 1.25% Asp-Arg | 2.5% Asp-Arg |
|---|---|---|---|---|---|
| mean (wt in g) | 5.92 | 6.37 | 7.41 | 6.63 | 8.42 |

Control: basal diet;
Asp/arg: amino acid mixture;
Asp-arg: dipeptide.

This species responded well to the addition of dipeptides, which increased the average final weight to around 144% of the control. The average weight of fish fed with feed containing 1.25% dipeptide also exceeded that of the control. Unlike the other two finfish species, African catfish also responded well to the addition of free amino acids, which had no positive effect in the other species. African catfish are classical omnivores and scavengers, which may be reflected in their ability to utilize multiple amino acid sources equally well.

2. *Oncorhynchus mykiss* after four months. Started with 50 fish.

|  | control | 1.25% Asp/Arg | 2.5% Asp/arg | 1.25% Asp-Arg | 2.5% Asp-Arg |
|---|---|---|---|---|---|
| mean (wt in g) | 13.19 | 11.64 | 11.75 | 13.63 | 15.33 |

Control: basal diet;
Asp/arg: amino acid mixture;
Asp-Arg: dipeptide.

This species also appeared to respond well to the addition of dipeptides, with the group that was fed with feed containing 2.5% dipeptides exhibiting an average final weight of around 115% of the control. Both of the groups fed with feed containing arginine and aspartic acid as free amino acids achieved average weights that were lower than the control. A suppression of growth in the presence of excess arginine is most likely due to a competitive inhibition of lysine and methionine uptake by arginine. This may be a strong argument for dipeptide supplementation in this species, as an arginine deficiency in the feed could not be alleviated by the addition of free amino acid.

3. *Oreochromis niloticus* after two months. Started with 50 fish.

|  | control | 1.25% Asp/Arg | 2.5% Asp/Arg | 1.25% Asp-Arg | 2.5% Asp-Arg |
|---|---|---|---|---|---|
| mean (wt in g) | 1.64 | 1.70 | 1.65 | 1.84 | 2.03 |

Control: basal diet;
Asp/Arg: amino acid mixture;
Asp-Arg: dipeptide.

This species reached a final weight of over 120% of the control in the group fed with feed supplemented with 2.5% dipeptide. Regardless the gender-specific differences in growth rate of the used wild-type tilapia (other than "monosex" tilapia), the results would be very encouraging because not only the highest average weights were achieved with the addition of dipeptide, but also the addition of free amino acids had no apparent effect on growth. This is a desirable trait as it indicates that—as in the case of rainbow trout—an arginine deficiency in the feed cannot be corrected by the addition of the free amino acid, leaving dipeptides as the only available alternative supplement.

4. *Marsupenaeus japonicus* after two months. Started with 48 shrimps.

|  | control | 1.25% Asp/Arg | 1.25% Asp-Arg |
|---|---|---|---|
| mean | 0.30 | 0.27 | 0.35 |

Control: basal diet;
Asp/Arg: amino acid mixture;
Asp-Arg: dipeptide.

Despite the fact that *Marsupenaeus japonicus* shrimp are slow feeders that permit a great amount of dipeptide or other soluble supplements to leach out of the feed during feeding, with the dipeptide feeding an average weight was achieved that was higher than that of the amino acid feeding and that of the control group.

Example 3: β-L-Aspartyl Dipeptides for Salmon Nutrition

The objective of the experiment was to examine the in vivo bioavailability of the above described "β-L-aspartyl-R" dipeptides in fish for the first time and consequently to determine their applicability as a substitute of free amino acids sources in Atlantic salmon (*Salmo salar* L.) nutrition. Therefore, varying supplementation levels of β-L-aspartyl-L-arginine in contrast to a mixture of free amino acids L-arginine and L-aspartic acid were compared.

315 Atlantic salmon (96.33 g±11.47 g; Danish Salmon AS, Hirtshals, DK) were acclimatized for 14 d in the experimental rearing system. The tanks of the system were part of a recirculation system (3.5 m$^3$ water volume, turnover rate 2 h$^{-1}$). The water purification system consisted of a mechanical filter, a moving bed filter, and a protein skimmer. Water quality parameters were maintained within a safe range for the fish (7.2-7.6 pH; GMH 3530, Digital pH-/mV-/Thermometer, Greisinger electronic, D; 22.5±0.3° C., 8.5±0.4 mg/l O$_2$; Handy Polaris; Oxy-Guard International A/S, Birkerod, Denmark; <0.4 mg/l NH$_4$—N; <0.24 mg/l NO$_2$—N; Microquant test kit for NH$_4$ and NO$_2$; Merck KgaA, Darmstadt, Germany). The light conditions were set to 14 h/10 h light/dark cycle. During acclimatization fish were fed a commercial salmon feed (Aller Gold 4 mm; AllerAqua A/S, Christiansfeld, Denmark). The fish were reared in 150 l aquaria. Triplicate fish groups (3×15) were fed to apparent satiation twice a day over a period of 10 weeks.

In order to fulfill the nutritional demands of Atlantic salmon (except for arginine content), the different concentrations of the test substances were added to a basal diet which was produced with the following common ingredients used for fish nutrition: Fish meal (*Clupea* sp.) 9.91%, Blood meal 1.93%, Casein 3.05%, Corn gluten 20.80%, Wheat gluten 22.09%, Biolysine™ 1.48%, Wheat starch 25.43%, Fish oil 11.13%, $Ca_2PO_4$ 0.46%, Vit/min premix 0.93%, $TiO_2$ 0.93%, and Carboxymethyl cellulose ad 100% (after adding the test supplements). The experiment was carried out with the resulting 7 dietary treatments:

Diet 1: Control diet (CD) with low arginine content (1.68 g/kg DM of feed)
Diet 2: CD+0.2% commercial mix of aspartic acid and arginine
Diet 3: CD+0.4% commercial mix of aspartic acid and arginine
Diet 4: CD+0.6% commercial mix of aspartic acid and arginine
Diet 5: CD+0.2% β-L-aspartyl-L-arginine dipeptide
Diet 6: CD+0.4% β-L-aspartyl-L-arginine dipeptide
Diet 7: CD+0.6% β-L-aspartyl-L-arginine dipeptide Samples of all experimental groups were analyzed for arginine retention in the lab of LUFA in Kiel. For the analysis of whole body composition, 3 fish were pooled per tank, freeze-dried for 168 h, homogenized, and stored at −18° C. Experimental diets and feces were homogenized and stored at −18° C. Analyses of dry matter (DM), crude ash, crude protein, and crude lipid were performed according to EU guideline (EC) 152/2009 (European Union, 2009a). Crude protein content (N×6.25) was determined by the Kjeldahl method, crude lipid content after hydrolysis with hydrochloric acid followed by a petroleum ether extraction using a Soxhlet extraction system, DM after drying at 103° C. until constant weight, and ash content after 4 h incineration at 550° C. in a combustion oven (P300; Nabertherm, Lilienthal, Germany). Furthermore, gross energy was measured in a bomb calorimeter (C 200; IKA, Staufen, Germany).

The statistical analyses were performed using SPSS 21.0 for Windows (SPSS Inc., Chicago, U.S.). Data are presented as mean±standard deviation (SD) for each treatment and compared between treatments. The Kolmogoroff-Smirnov Test was used to check data for normal distribution. Data were analyzed for variance homogeneity by Levene (p<0.05). If homogeneity was given, a univariate analysis of variance (one-way ANOVA) combined with a Tukey post-hoc test was performed to check for significant differences. If normal distribution or homogeneity of variance was not given, a Kruskal Wallis ANOVA (pairwise) was performed. For a comparative exponential model of arginine retention:

$$Y=a+b(1-e^{(-c*(dipeptide+d*L-arginine))})$$

(Anonymus, 2012), SAS (SAS Institute Inc., Cary, U.S.) was used.

Results:

None of the test groups showed mortalities, abnormal behavior, or apparent detrimental effects during the experiment. Postmortem inspection, tissue and blood analysis revealed no adverse effects or abnormalities. Thus, the β-dipeptide product can be considered safe for fish. All groups started at almost the same weight and almost doubled their weight during the experiment. Results of all monitored health parameters where in ranges indicating healthy fish.

The gross nutrient analysis of whole body showed no statistical significant differences between the treatment groups, but the β-dipeptide product caused a higher body protein level compared to the free amino acid groups.

The amino acid demand of Atlantic salmon in general as well as the arginine demand is not very well investigated. Literature estimates of the arginine demand range from 16.0 g/kg DM feed (Berge et al., Comp. Biochem. Phys. A 117: 501-509 (1997)) to 21.4 g/kg DM feed (Lall et al., Aquaculture 124: 13-25 (1994)), which is a relatively wide bandwidth. One aim of this study was to use raw materials in the test diets that are common in fish nutrition, and not only free amino acid premixes. Using these raw materials, the lowest arginine level that could be achieved without failing to meet the demands for other amino acids known for salmon nutrition was 16.8 g/kg DM. With supplementation rates of 2, 4 and 6 g/kg DM, the dietary arginine contents were within the range of documented arginine demands. Based on the performance data obtained from all diets, an arginine demand of about 20.1 g/kg DM could be calculated using a 2nd degree polynomial regression model.

A clear decrease in weight gain was observed at the highest level of supplementation with free amino acid, which was not seen when the feed was instead supplemented with an equivalent level of dipeptides (FIG. 1). This is consistent with the uptake antagonism between arginine, lysine, and methionine known in other vertebrates, where high levels of one amino acid can inhibit the uptake of the others, leading to decreased growth responses. In this experiment, the high levels of free arginine present at the highest supplementation level may have caused an inhibition of lysine or methionine uptake, which led to the observed lower weight gain.

As amino acid transport mechanisms are known to be incapable of transporting oligopeptides, such an inhibition is not expected when dipeptides are used as a supplement instead of free arginine. Dipeptides are absorbed in the mid and the distal parts of the intestine, while free amino acids are absorbed in the pyloric caeca and mid gut of Atlantic salmon (Bakke-McKellep et al., Fish Physiol. Biochem. 22: 33-44 (2000)). This may lead to a temporal delay in arginine resorption compared to the lysine absorption in the case of the β-dipeptide. Lysine is an inhibitor or arginase and therefore hinders arginine conversion. This can explain the higher abundance of arginine in the salmon fed with arginine β-dipeptide. Assuming that the higher arginine levels are an effect of the temporal delay in absorption, the use of a lysine β-dipeptide could enhance the performance of free or protein-bound arginine on growth in a similar way as altering the total lysine/arginine ratio has done in other studies (Berge et al., Aquaculture Nutrition, 8: 239-248 (2002)). This could result in a reduction in lysine and/or arginine addition without influencing the growth performance of fish.

The comparison of the two arginine forms (β-dipeptide vs. free arginine) was limited to the supplementation levels of obvious arginine restriction. This allowed the use of linear regression models to compare the biological performance and availability of supplemented arginine sources under these conditions. However, due to the great variance within the treatments, only a linear regression with mean values of the treatments excluding the 0.6% groups showed a good fit. Based on the slopes of the regression (arginine dipeptide=100% performance), the commercial mix (Arg) reached only 19.5% of the retention rates compared to the dipeptide form of arginine (FIG. 2).

This five-fold better bioavailability of the dipeptide form provided an increased amount of body protein than the free form. Additionally, the dipeptide form may lead to advantages in all biological processes where arginine plays an important role, e.g. in the immune response of vertebrates (Bronte and Zanovello, Nat. Rev. Immunol. 5: 641-654 (2005)).

The invention claimed is:

1. A method for culturing aquatic animals, said method comprising feeding the aquatic animals with a composition comprising one or more β-dipeptides having the formula
(β-L-aspartyl-R),
or oligomers thereof having the formula
(β-L-aspartyl-R)$_n$,
or salts thereof, wherein R in both formulas is an amino acid residue selected from arginine, lysine, ornithine, glutamate, citrulline, and canavanine, and n is an integer of 2 to 150.

2. The method of claim 1, wherein the amino acid residue R is arginine or lysine.

3. The method of claim 1, wherein the amino acid residue R is of L- or D-configuration.

4. The method of claim 1, wherein the composition comprises the dipeptides β-L-aspartyl-L-arginine and/or β-L-aspartyl-L-lysine.

5. The method of claim 1, n is an integer of 2 to 30.

6. The method of claim 1, wherein one or more of the β-dipeptides are chemically modified.

7. The method of claim 1, wherein the composition comprises from 0.01 to 50 wt. % of the β-dipeptides.

8. The method of claim 1, wherein the composition further comprises one or more free amino acids or salts thereof.

9. The method of claim 8, wherein the free amino acids are selected from the group consisting arginine, lysine and methionine.

10. The method of claim 8, wherein the composition comprises from 0.01 to 10 wt. % of free amino acids.

11. The method of claim 1, wherein the aquatic animals are selected from the group of aquatic animals consisting of fish, including eggs, fry, juvenile fish and adult fish, and shellfish, including eggs, larvae, juvenile and adult shellfish.

12. The method of claim 11, wherein the feeding comprises dipping the fishes and/or shellfishes in a solution or suspension comprising the composition comprising said one or more β-dipeptides, or oligomers thereof, or salts thereof.

13. The method of claim 12, wherein the solution or suspension contains water.

14. The method of claim 12, wherein the amount of the composition in the suspension is from 0.01 to 10 wt. %.

15. The method of claim 12 further comprising a culture of adult fish and/or adult shellfish by administering the composition comprising said one or more β-dipeptides, or oligomers thereof, or salts thereof.

16. The method of claim 1 comprising the culture of adult aquatic animals, including adult fish and/or adult shellfish, by administering the composition comprising said one or more β-dipeptides, or oligomers thereof, or salts thereof.

17. The method of claim 1, wherein the composition provides for superior bioavailability of their constituting amino acids in the aquatic animals and for an enhanced meat quality of the aquatic animals, including an enhanced Omega-3/Omega-6 ratio in favor of Omega-3 fatty acids.

18. A method for culturing fish or shellfish, said method comprising feeding the fish or shellfish with a composition comprising one or more β-dipeptides selected from the group consisting of β-L-aspartyl-L-arginine and β-L-aspartyl-L-lysine, or salts thereof.

19. The method of claim 5, wherein n is an integer of 2 to 10.

* * * * *